Sept. 24, 1929.　　　　A. F. GERDES　　　1,728,993
ADJOINT PIECE FOR TELESCOPE SIGHTS
Filed May 9, 1927
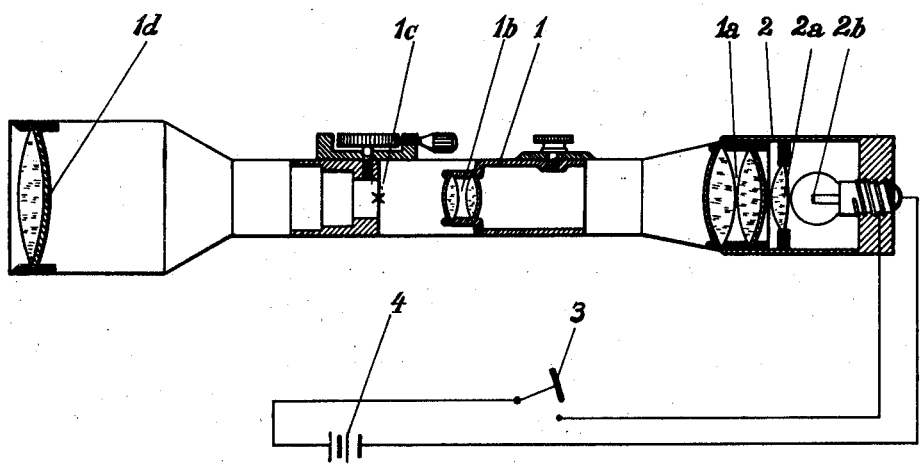
Inventor
Adolf Friedrich Gerdes Patented Sept. 24, 1929

1,728,993

UNITED STATES PATENT OFFICE

ADOLF FRIEDRICH GERDES, OF BERLIN, GERMANY

ADJOINT PIECE FOR TELESCOPE SIGHTS

Application filed May 9, 1927, Serial No. 189,938, and in Germany June 4, 1926.

The invention relates to an adjoint-piece for telescope-sights to be pushed onto the eye-piece setting, embracing in addition to the axially shiftable light source a convex lens positioned before the latter in such manner that said lens can be brought close to the eye-piece of the telescope-sight, the angle of the useful pencil being as large as the space between the eye-piece of the telescope-sight and the light source in the focus of the adjoint-lens according to the latter's thickness will allow.

The object of the invention is to throw as many rays as possible from a shortest possible distance from the eye-piece or ocular of the telescope-sight and by the effect of same onto the sighting plane or concentrical portion thereof, and to project the sighting pointer thereon.

This object is attained according to the invention by arranging a highly convex lens between the light source and the ocular of the telescope-sight in such manner that it can be shoved close to the ocular, the light source standing so in the focus of said lens that the rays enter the ocular of the telescope-sight parallel and then follow the path of the objective rays in an inverted direction, whereby the image of the object aimed at and of the sight pointer appears with very great distinctness.

In night sighting devices it is advisable instead of illuminating the entire field of vision, to illuminate a concentric part thereof only, but in this case all the more intensively. For this reason a lens of smaller diameter than that of the ocular is used in the adjoint-piece. The smaller the lens, however, the higher may be its dioptric for the same thickness, whereas the focus and accordingly the light source are moved nearer the ocular of the telescope-sight.

The dimensions of the illuminated part of the sighting plane depend on the size of the adjoint-lens and is suited to the particular needs of the occasion.

In night sighting devices an arrangement of the light source in the exit pupil of terrestrial telescope-sights is already known. The exit pupil is, however, located about 80 mms. away from the ocular, in order to prevent injury to the eye.

According to the invention the exit pupil which coincides with the focus of the adjoint-lens, that is, with the light source, is positioned at a distance of about 16 mms. from the ocular of the telescope-sight. The utilization of the light is accordingly 5 x 5 or 25 times that of night sighting devices heretofore in use, as the effect of the rays increase with the square of the reduced distance between exit pupil and ocular.

An application of the invention is shown in section in the accompanying drawing.

The adjoint-piece 2 which constitutes the object of the invention, on the ocular setting $1^a$ is pushed onto the ordinary telescope-sight 1. The adjoint-piece 2 is provided with the adjoint lens $2^a$ located in front of the light source $2^b$ in such manner that said lens $2^a$ can be brought close to the ocular of the telescope-sight and the rays so refracted that they enter the ocular parallel or nearly so and then follow the path of the objective rays in an inverted direction through the inverting lens system $1^b$ to be concentrated then on sight image $1^c$. The rays converged at this point are projected by the objective $1^d$ on the objective plane where the reconstructed sight image appears with great distinctness when by means of the sliding contact 3 the circuit 4 of the light source $2^b$ is closed.

I claim:—

1. Adjoint-piece for telescope-sights, comprising in addition to the well-known axially shiftable light source a highly convex lens positioned in front of said light source and adapted to be brought close to the ocular of the telescope, the source of light being arranged in the focus of said lens.

2. Adjoint-piece for telescope-sights according to claim 1, comprising a lens the diamter of which is in the same ratio to the diameter of the ocular of the telescope-sight as that of the desired diameter of the exposed portion of the sight plane to the diameter of the entire field of vision, whereby the focal distance of said lens is so short that the angle of the useful pencil is larger than in an adjoint-lens of the same diameter as the ocular lens, the distance between the light source and the ocular of the telescope-sight being reduced to a minimum.

In testimony whereof I affix my signature.

ADOLF FRIEDRICH GERDES.